Nov. 5, 1935.  R. M. WOYTYCH  2,019,774

CARRIAGE SUPPORT

Filed Dec. 14, 1931  4 Sheets-Sheet 1

Inventor:
Raymond M. Woytych
By Chindahl, Parker & Carlson
Attys.

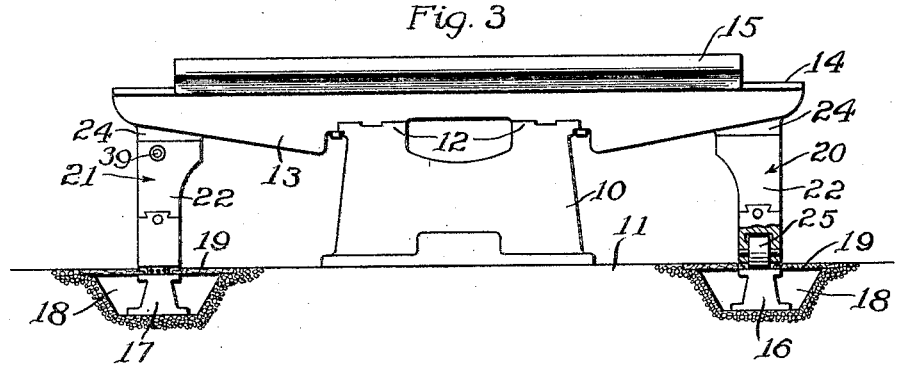
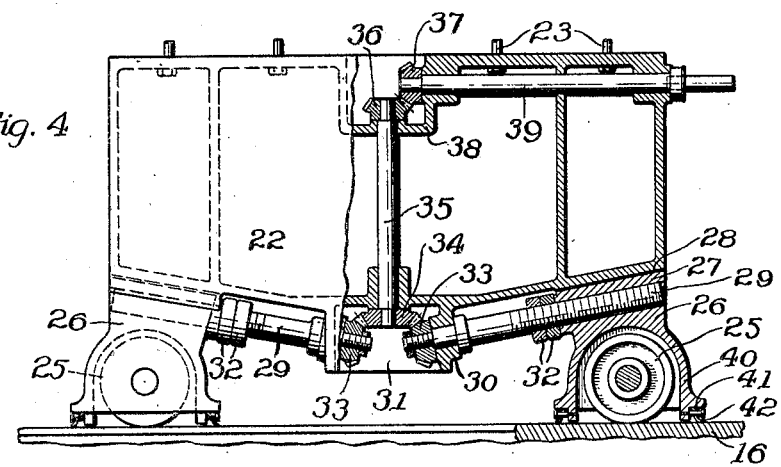
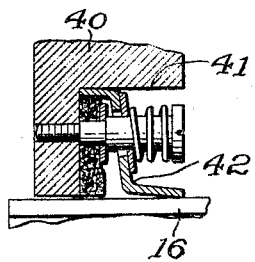
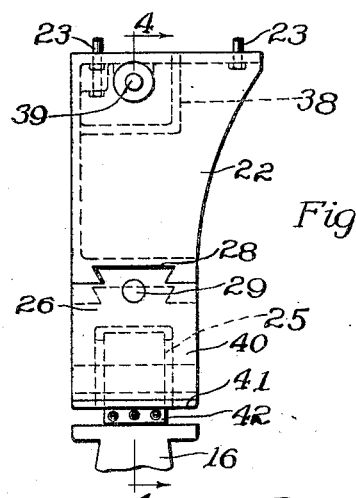

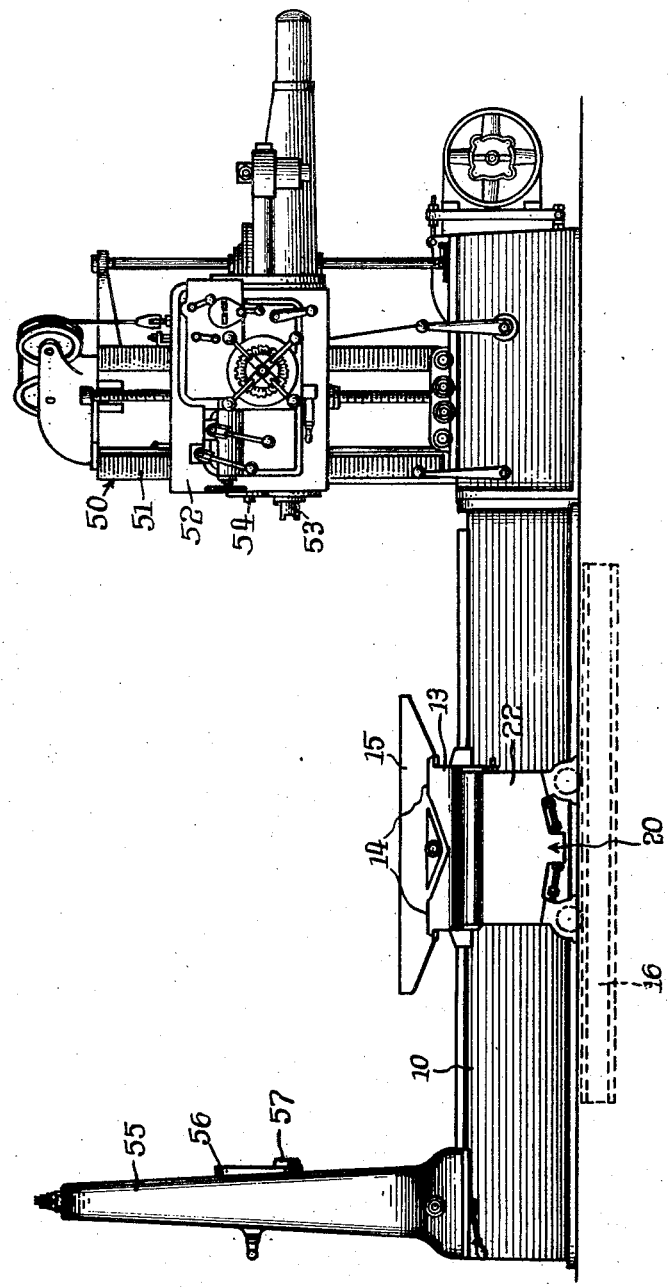

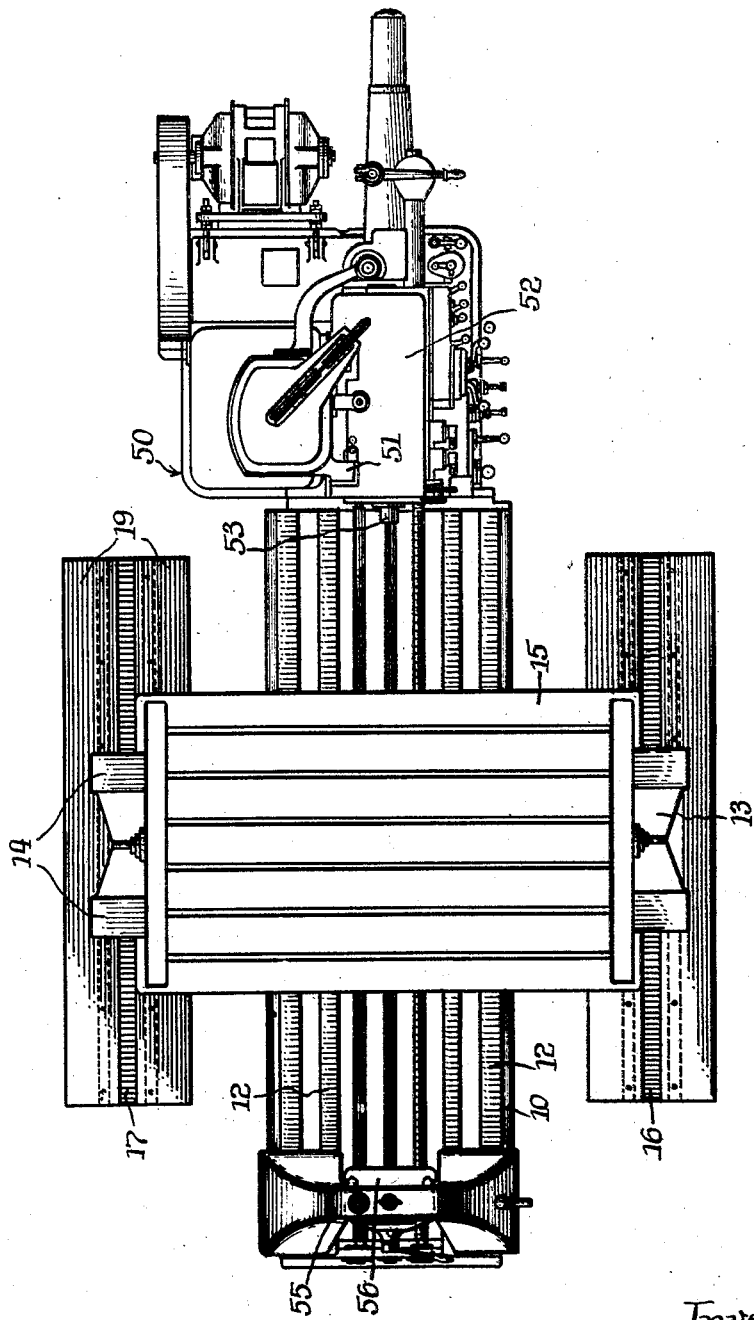

Patented Nov. 5, 1935

2,019,774

UNITED STATES PATENT OFFICE 2,019,774

CARRIAGE SUPPORT

Raymond M. Woytych, Fond du Lac, Wis., assignor to Giddings & Lewis Machine Tool Co., Fond du Lac, Wis., a corporation of Wisconsin Application December 14, 1931, Serial No. 580,860

16 Claims. (Cl. 90—58)

The present invention relates to improvements in supports for travelling machine tool carriages, and in its specific adaptation has particular reference to supplemental means for supporting a saddle which is movable horizontally along a machine bed and which in turn supports a table for horizontal movement transversely of the bed.

In carriage assemblies of the foregoing character, which are commonly found in horizontal boring, drilling and milling machines as one instance, the saddle has a considerable overhang at opposite sides of the machine bed so as to provide a substantial range of travel for the table. Where the saddle-table structure is supported solely by the bed, as has been the practice heretofore, the overhang of the saddle is objectionable in that it tends to cause an off balance relationship when the table is near either of its end positions, and as a result the sizes and permissible range of movement of the parts are limited beyond what would otherwise be advantageous.

The primary object of the present invention resides in the provision of novel means disposed at opposite sides of and supplemental to a central support or machine bed for supporting the ends of an overhanging carriage or saddle.

A more specific object is to provide novel means for supporting the overhanging ends of the saddle comprising side rails disposed alongside the machine bed, and adjustable depending supports on the ends of the saddle for coacting with the rails in all positions of travel of the saddle along the bed.

Further objects and advantages will become apparent as the description proceeds.

In the accompanying drawings, Figure 1 is a fragmentary plan view of a machine tool embodying the features of my invention.

Fig. 3 is a fragmentary end elevational view.

Fig. 4 is an enlarged front elevational view, partially in section along line 4—4 of Fig. 5, of one of the supplemental supports.

Fig. 5 is an enlarged end elevational view of the supplemental support shown in Fig. 4.

Fig. 6 is a fragmentary sectional view of a detail.

Fig. 7 is a side elevational view on a reduced scale of the machine tool shown fragmentarily in Fig. 1.

Fig. 8 is a plan view on a reduced scale of the machine tool.

Figure 1:
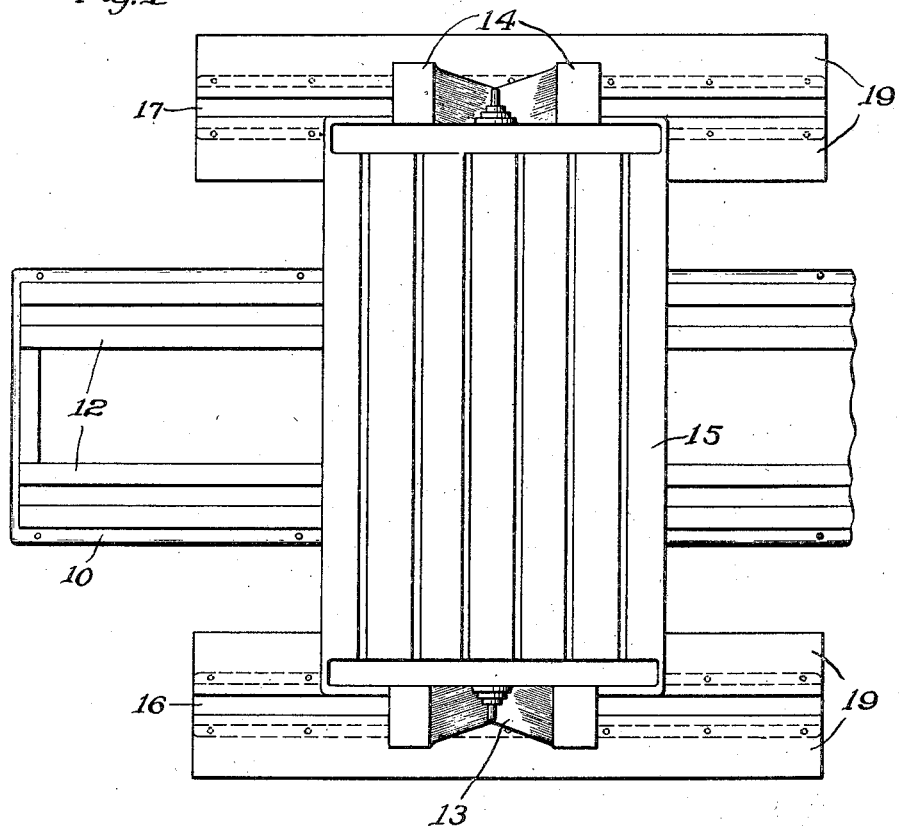
Figure 2:
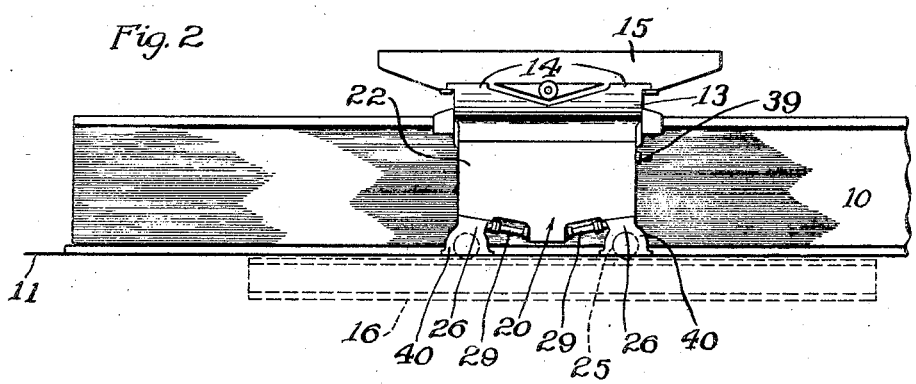
Fig. 2 is a fragmentary side elevational view.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the drawings, the invention in its preferred from is shown as applied to a machine having a horizontal main bed or frame 10 resting on a solid foundation 11. The bed 10 in the present instance is elongated and is formed along its upper longitudinal edges with parallel spaced ways or guiding means 12. A saddle or carriage 13 of suitable construction is mounted on the ways 12 for translation along the bed. The saddle is formed along its upper edges with parallel spaced ways 20 or guiding means 14 extending transversely of the bed, and is elongated so as to overhang the opposite sides of the bed as illustrated in Fig. 3. Slidably disposed on the ways 14 for translation laterally of the bed 10 is a table 15 of suitable construction. The specific means for driving the saddle 13 and the table 15 per se constitute no part of the present invention, and therefore are not shown herein. Suitable driving means are disclosed in a copending application, Serial No. 442,055, filed April 7, 1930 by Keith F. Gallimore.

Rigidly mounted on one end of the bed 10 is an upstanding column 50 provided with vertical guides or ways 51 on which a spindle headstock 52 is adapted to travel. The headstock comprises a main horizontal spindle 53 and may also include a parallel auxiliary spindle 54, both spindles projecting from the side adjacent the table 15 for the attachment of tools or cutters (not shown) adapted to operate on the work on the table.

Removably and adjustably mounted on the ways 3 on the other end of the bed 10 is an upstanding column or support 55 on which an end block or tailstock 56 is adapted to travel synchronously with the headstock 52. The tailstock carries a suitable support 57 adapted to be positioned in axial alinement with the main spindle 53 and to coact therewith in supporting a suitable tool bar or arbor (not shown) when it is desired to use the latter.

Suitable power drive means is provided for the various movable elements of the machine, including speed and direction control mechanisms. These are controlled automatically or by manually-operated devices such as hand levers or the like, most or all of which are grouped together so that the operator of the machine may reach any one or all of them from one position. Since the work pieces to be operated upon by this machine are generally large, it is especially desirable to avoid any errors in machining each work piece. It is therefore preferable that the control levers be grouped in such position that the operator may reach such levers and at the same time obtain a close-up view of the work at the point of cutting, so that he can operate such levers without delay. To this end, the position of the control levers is preferably on the front side of the machine adjacent the headstock, as shown in Figs. 7 and 8. The operator can thus stand close to the bed 10 between the table 15 and the headstock column where he can closely inspect the work as it is machined and still be within easy reach of the control levers.

One of the primary features of the present invention resides in the provision of novel means supplementing the machine bed 10 for supporting the overhanging ends of the saddle 13 in all positions of travel along the bed. While in the broad concept of the invention, this supplemental supporting means may assume various forms, in its preferred embodiment, it comprises a pair of auxiliary beds in the form of guide rails 16 and 17 mounted in the foundation 11 at opposite sides of and in parallel relation to the bed 10, and coextensive in length with the anticipated extent of travel of the carriage 13. Referring more particularly to Fig. 3, each of the rails 16 and 17 is seated on the bottom of a trough 18 formed in the foundation 11, and projects to a height slightly below the upper surface of the foundation. Each trough 18 is covered at the sides of the rail by means of closure members in the form of boards or plates 19 which are seated in notches 19a in the foundation 11 and rest on the longitudinal edges of the rail. Thus, the tops of the boards 19 are at the same level as the top of the foundation.

The ends of the saddle 13 are provided with depending supplemental supports 20 and 21 adapted respectively for engagement with the rails 16 and 17. In the present instance, the two supports 20 and 21 are alike in construction, and hence a detailed description of the support 20 will suffice for both, corresponding parts of the other, however, being indicated by like reference characters.

The support 20 preferably comprises a depending bracket 22 which is rigidly secured, as by means of bolts 23, at its upper end to a flat horizontal face plate 24 formed integral with the underside of the overhanging front end of the saddle 13, and which is substantially coextensive in width with the saddle. Suitably mounted in the lower end of the bracket 22 are two supporting contact members, preferably rollers 25, for engaging the rail 16.

Preferably, the rollers 25 are adjustable vertically so as to adapt same for accurate engagement with the rail 16. Hence, close location of the rail 16 at a definite distance from the top of the bed 10 is unnecessary in setting up the machine. Moreover, wear, if any, can be compensated for. To mount the rollers 25 for adjustment, they are journaled respectively in two slides 26 on the underside of the bracket 22. In the present instance, the slides 26 are formed on the top with dove-tailed guides 27 which slidably engage in dove-tailed guideways 28 formed in the bottom of the bracket 22 at opposite sides thereof. These guideways 28 are slightly inclined downwardly and inwardly from the horizontal so that upon lateral adjustment of the slides 26 therealong, a vertical adjustment will also be effected.

Preferably, a single means is provided for adjusting the slides 26 simultaneously along the ways 28 toward or from each other, so as to adjust the vertical position of the rollers 25. In the present instance, this means comprises a pair of screw shafts 29 journaled against endwise movement at their adjacent ends in bearings 30 in a central depending housing 31 on the underside of the bracket 22, and respectively in threaded engagement at their remote outer ends with the slides 26. The shafts 29 are disposed respectively at the same angles as the ways 28. Suitable lock nuts 32 are provided on each shaft 29, and are adapted to be tightened against the inner end of the associated slide 26 to secure the parts rigidly in position of adjustment.

The inner adjacent ends of the shafts 29 in the housing 31 are connected respectively through bevel gears 33 to a bevel gear 34 on the lower end of a vertical shaft 35 journaled centrally in the bracket 22. The upper end of the shaft 35 is operatively connected through meshing bevel gears 36 and 37 in a central housing 38 integral with the top of the bracket 22 to a horizontal shaft 39 journaled in and projecting from one side of the bracket. The outer end of the shaft 39 is provided with a squared end for the reception of a suitable tool (not shown) whereby it may be manually adjusted as desired.

Preferably, each slide 26 is formed integral with a housing 40 enclosing the associated roller 25 and opening downwardly in closely spaced relation to and over the rail 16. Opposite side edges of the housing 40 are formed with notches 41 in each of which a suitable spring-pressed wiper 42, such as is disclosed in an application by William E. Rutz and Raymond M. Woytych, Serial No. 554,796, filing date August 3, 1931, is mounted for yieldable sliding engagement with the top of the rail 16.

I claim as my invention:

1. In a machine tool, in combination with a horizontal foundation, an elongated horizontal machine bed mounted on said foundation, a saddle slidably mounted on said bed for translation longitudinally thereof, the ends of said saddle extending beyond the sides of said bed and overhanging said foundation, two troughs formed in said foundation respectively at opposite sides of and in parallel spaced relation to said bed, two guide rails one mounted in each of said troughs, closures for the troughs at opposite sides of said rails, two depending brackets mounted respectively on the undersides of said ends of said saddle, and a pair of spaced rollers mounted for vertical adjustment on each of said brackets for operative engagement with the underlying rail.

2. In a machine tool, in combination, a horizontal machine bed, a carriage slidably disposed on said bed, said carriage having an end projecting laterally of said bed, a fixed support underlying said end, a depending bracket secured to the underside of said end, the bottom of said bracket being formed with two sets of ways oppositely inclined inwardly and downwardly from the horizontal bed, two slides one mounted on each of said sets of ways, two rollers one journaled in each of said slides for rolling engagement with said support, and a single means for simultaneously adjusting said slides along said ways to adjust the vertical position of said rollers relative to said support.

3. In a machine tool, in combination, a horizontal elongated machine bed, the top of said bed being formed along opposite sides with longitudinal ways, a carriage slidably disposed on said ways, said carriage having a portion projecting laterally beyond said bed, a fixed way underlying said portion, a depending bracket secured to said portion, said bracket being formed with a downwardly inclined way on its underside, a slide mounted on said inclined way, a roller journaled in said slide for engagement with said fixed way, and means for adjusting said slide along said inclined way to adjust the vertical position of said roller relative to said fixed way.

4. In a machine tool, in combination, a horizontal machine bed, a carriage slidably disposed on said bed, said carriage having an end portion projecting laterally beyond said bed, a fixed way underlying said portion, a depending bracket secured to said portion, two slides adjustably mounted on said bracket, two rollers one journaled in each of said slides for engagement with said way, two screw shafts rotatably anchored in said bracket and in threaded engagement respectively with said slides, and a single shaft operatively geared to said screw shafts for adjusting said screw shafts simultaneously.

5. In a machine tool, in combination, a horizontal machine bed, a carriage slidably disposed on said bed, said carriage having an end projecting laterally beyond said bed, a fixed support underlying said end, a depending bracket secured to the underside of said end, the bottom of said bracket being formed with ways extending longitudinally of said bed and inclined to the horizontal, means slidably engaging said ways, a pair of supporting contact members mounted on said means and engaging said support and spaced a substantial distance apart, and means for adjusting said first-mentioned means along said ways to adjust the vertical position of said members relative to said support.

6. In a machine tool, in combination, a horizontal machine bed, a carriage slidably disposed on said bed, said carriage having an end portion projecting laterally beyond said bed, a fixed way underlying said portion, a depending bracket secured to said portion, means mounted for vertical adjustment on said bracket, a supporting contact member on said means for engagement with said way, means anchored in said bracket and having threaded engagement with said first-mentioned means, and means operatively connected to said threaded means for adjusting said threaded means.

7. In a metal working machine of the character mentioned, the combination of a monolithic concrete foundation, a main bed, an auxiliary bed extending lengthwise of said main bed at the side of said main bed, said beds located on said foundation, a carriage shiftable lengthwise of said main bed and provided with an extension extending laterally beyond said main bed over said auxiliary bed, guiding means extending lengthwise of said beds between said main bed and said carriage, guiding means parallel therewith between said auxiliary bed and said extension, a work table shiftable on said carriage transversely of said main bed into locations above said main bed and above said auxiliary bed, guiding means at right angles to said first named guiding means between said table and said carriage and its extension, and a tool spindle operable in a plane above the level of said table for operating on the work on said table, said guiding means between said table and said carriage and its extension and between the latter and said main bed and auxiliary bed located substantially throughout their areas in vertical planes in which said foundation is located and being such that said table has support thereunder through said carriage and its extension and said beds substantially throughout the work supporting area of said table throughout positions of substantially all work supporting portions of said table in the vertical plane in which said spindle is located.

8. In a metal working machine of the character mentioned, the combination of a main bed, a column at the end of said main bed, a head elevationally movable thereon, a tool-spindle carried by said head and extending lengthwise of said main bed, an auxiliary bed at the side of and parallel with said main bed, a carriage on said main bed, said carriage provided with an extension extending laterally beyond said main bed over said auxiliary bed, a work table on said carriage shiftable crosswise of said main bed and said spindle along said carriage and its extension, said work table having a work supporting surface throughout substantially its area, guideways between said main bed and said carriage and between said auxiliary bed and said extension, and guideways between said table and said carriage and its extension, said carriage shiftable lengthwise of said beds on said first-named guideways, and said table shiftable crosswise of said beds on said second-named guideways, a rigid support vertically under substantially all portions of all said guideways, and arranged for having said beds and said carriage and its extension under substantially the entire work supporting surface of said table and substantially said entire work-supporting surface of said table above said rigid support throughout all shiftable positions of said carriage and said table.

9. In a metal working machine of the character mentioned, the combination of a main bed, an auxiliary bed at the side of the same, there being an operator's walking space between said main bed and said auxiliary bed, a rigid foundation vertically under substantially the entire area of said beds and said space, a carriage on said main bed, said carriage provided with an extension extending laterally beyond said main bed over said auxiliary bed, a work table on said carriage shiftable crosswise of said main bed along said carriage and its extension, said extension spanning said operator's walking space for permitting walking of the operator between said beds alongside said carriage and its extension and said table, parallel guideways extending lengthwise of said beds between said main bed and said carriage and between said auxiliary bed and said extension, and guideways at right angles to said last-named guideways between said table and said carriage and its extension, said carriage shiftable lengthwise of said beds on said first-named guideways, and said table shiftable crosswise of said beds on said second-named guideways, whereby to have said beds and said carriage and its extension under substantially the entire work supporting surface of said table and substantially the entire work supporting surface of said table vertically above said foundation throughout all shiftable positions of said carriage and said table.

10. In a metal working machine of the character described, the combination with a monolithic concrete foundation, of a main bed, an auxiliary bed parallel with said main bed, said beds throughout substantially their areas located in vertical lines above said foundation, a carriage shiftable along said main bed and provided with an extension extending laterally beyond said main bed and over said auxiliary bed, a work-table shiftable crosswise of said beds along said carriage to positions above said main bed and said auxiliary bed, guideways extending lengthwise of said beds and located respectively between said main bed and said carriage and between said auxiliary bed and said extension, and guideways at right angles to said last-named guideways and located between said carriage and said worktable, all said guideways substantially throughout their areas located in vertical lines above said foundation.

11. A machine tool having, in combination, an elongated bed frame of substantial height arranged to be set upon a floor, and having a width sufficient to provide a way extending longitudinally on its upper side, a saddle slidably mounted on said way and extending a substantial distance beyond one side edge of said bed, a rail structurally separate from said bed frame adapted to be mounted in the floor with its upper face substantially flush with the floor and parallel to and spaced a substantial distance from said way to underlie the extending portion of said saddle, and a support depending from said portion of the saddle and having a movable bearing contact with said rail to support said saddle in all positions of adjustment longitudinally of the bed.

12. A machine tool having, in combination, an elongated bed frame and a saddle extending crosswise of the bed frame, said bed frame comprising a structure arranged to rest on and to extend above the floor and having longitudinal ways on its upper face supporting the saddle intermediate its ends for movement longitudinally of the bed frame, said structure having a width substantially less than the length of said saddle, and means to support the ends of said saddle comprising additional ways positioned substantially flush with the floor and spaced from said bed frame structure at the respective sides thereof and extending parallel to the ways on the bed frame structure, and a pair of supporting members rigid with and at the ends of said saddle and bearing on said additional ways to support the ends of said saddle during its movement longitudinally of the bed frame.

13. In a metal working machine of the character described, the combination with a generally horizontal foundation, of an elongated main bed mounted on said foundation, said foundation being formed with a trough along one side of said bed, an elongated supporting member mounted in said trough and extending in substantially parallel relation to said bed, a carriage slidable on said bed longitudinally thereof and having an extension projecting laterally of said bed over said supporting member, and depending means on said extension slidably engaging said supporting member.

14. In a metal working machine of the character described, the combination with a generally horizontal foundation, of an elongated main bed mounted on said foundation, said foundation being formed with a trough along one side of said bed, an elongated supporting member mounted in said trough and extending in substantially parallel relation to said bed, means closing said trough at opposite sides of said supporting member, a carriage slidable on said bed longitudinally thereof and having an extension projecting laterally of said bed over said supporting member, and depending means on said extension slidably engaging said supporting member.

15. In a metal working machine of the character described, the combination with a generally horizontal foundation, of an elongated main bed mounted on said foundation, said foundation being formed with a trough along one side of said bed, an elongated supporting member mounted in said trough and extending in substantially parallel relation to said bed, notches formed in said foundation along the side margins of said trough, spaced elongated closure members resting in said notches and on said supporting member to close said trough at opposite sides of said supporting member, a carriage slidable on said bed longitudinally thereof and having an extension projecting laterally of said bed over said supporting member, and depending means on said extension slidably engaging said supporting member between said closure members.

16. In a metal working machine of the character described, the combination with a generally horizontal foundation, of an elongated main bed mounted on said foundation, said foundation being formed with a trough along one side of said bed, an elongated supporting member mounted in said trough and extending in substantially parallel relation to said bed, means closing said trough at opposite sides of said supporting member, a carriage slidable on said bed longitudinally thereof and having an extension projecting laterally of said bed over said supporting member, a depending bracket on said extension and having contact means in bearing engagement with said supporting member, and wipers on said bracket at opposite sides of said contact means longitudinally of said supporting member and being spring pressed into wiping engagement with said supporting member.

RAYMOND M. WOYTYCH.